United States Patent Office 3,557,424
Patented Jan. 26, 1971

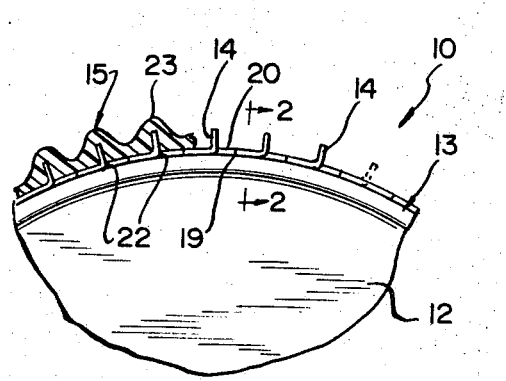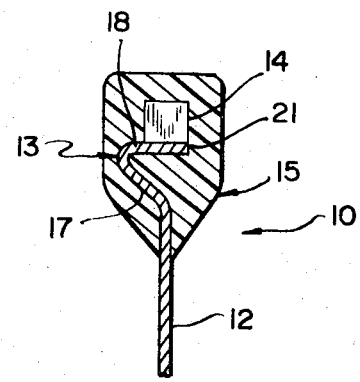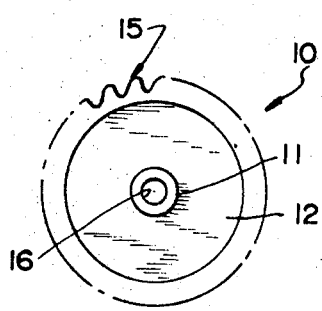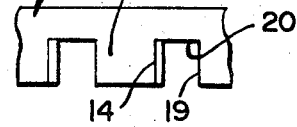
INVENTORS
ROBERT H. MEAD
HEWART H. HEATHWAITE
WILLIAM T. PAUL
BY Evan D Roberts
ATTORNEY

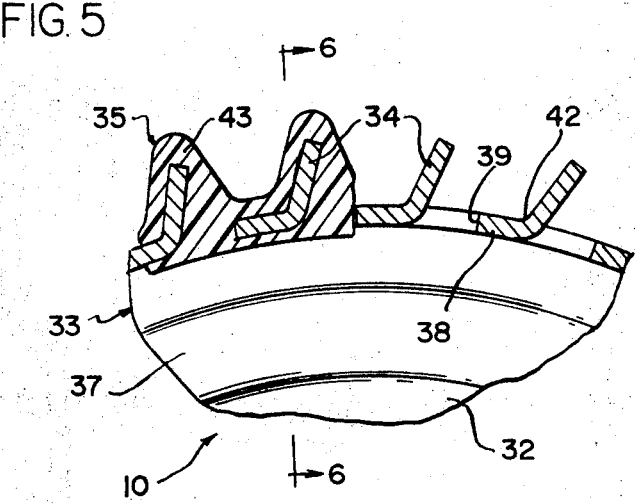
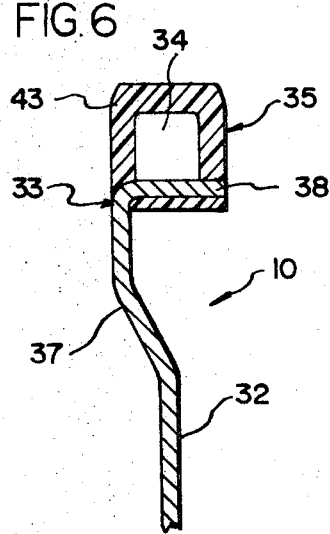
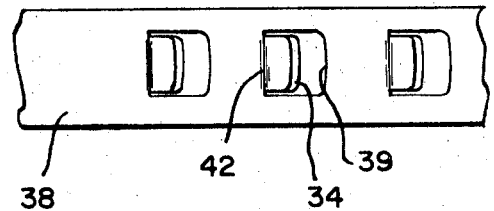

3,557,424
METHOD OF MAKING A COMPOSITE DRIVE WHEEL
Hewart H. Heathwaite, Robert H. Mead, and William T. Paul, Ithaca, N.Y., assignors, by mesne assignments, to Borg-Warner Corporation, Chicago, Ill., a corporation of Delaware
Original application Oct. 30, 1967, Ser. No. 678,833, now Patent No. 3,469,466, dated Sept. 30, 1969. Divided and this application Apr. 2, 1969, Ser. No. 839,106
Int. Cl. B21d 53/28; B21h 5/00; B21k 1/30; B23p 15/14; B29d 15/00
U.S. Cl. 29—159.2
2 Claims

ABSTRACT OF THE DISCLOSURE

Composite sprocket and drive wheel devices are disclosed herein to provide an illustration of this invention. This wheel includes a circular plate body which is stamped and formed with a laterally extending flange along the periphery thereof. Portions of the flange provide tooth roots over which a plastic toothed rim is molded.

---

The present application is a divisional application of Ser. No. 678,833, filed Oct. 30, 1967, now Pat. No. 3,469,466 granted Sept. 30, 1969 and entitled "Composite Drive Wheel."

SUMMARY OF THE INVENTION

This invention relates to a composite drive wheel device wherein a plate comprises a wheel body, an outer portion spaced inwardly from the periphery thereof is formed at an angle with respect to the plane of the plate and the outer peripheral portion is formed substantially perpendicular with respect to the plane of said plate to provide an enlarged peripheral flange portion. The outer peripheral portion of the flange is serrated at space positions therealong and the serrated portions are bent radially outwardly from said flange to provide tooth roots. A toothed plastic rim is molded over said tooth roots and both portions of said flange with the tooth roots in respective complemental relationship with the rim teeth.

Other advantages and novel aspects of the invention will become apparent upon the following detailed description, in conjunction with the accompanying drawings wherein:

FIG. 1 is a general illustrative representation of a first embodiment of the composite drive wheel device of this invention, showing a stamped plate with a serrated flange on the periphery thereof which provides tooth roots which are enclosed in the plastic toothed drive rim molded thereover;

FIG. 2 is a partial view of the composite drive wheel of the first embodiment of this invention showing the configuration of the tooth roots thereof;

FIG. 3 is an enlarged partial sectional view taken along line 3—3 of FIG. 2 showing the configuration of the flange formed on the periphery of the first embodiment of this invention;

FIG. 4 is an edge view of the plate taken from the top (FIG. 2) showing the tooth roots formed from the serrated flange of the first embodiment of this invention;

FIG. 5 is a partial view of the composite drive wheel of a second embodiment of this invention showing the configuration of the tooth roots thereof;

FIG. 6 is a partial sectional view taken along line 6—6 of FIG. 5 showing the configuration of the flange formed on the periphery of the second embodiment of this invention; and FIG. 7 is an edge view taken from the top (FIG. 5) showing the tooth roots formed from the serrated flange of the second embodiment of this invention.

A composite drive wheel generally designated by the numeral 10 (FIG. 1) is shown for the purpose if illustrating and describing this invention. The composite sprocket 10 of the first embodiment of this invention includes generally, among other things, a hub 11, a stamped plate body 12, a flange 13, tooth roots 14 and a plastic toothed rim 15. The hub 11 is secured to the stamped plate body 12 and is adapted with an aperture 16 to drivingly receive a drive or driven shaft.

The plate 12 of the first embodiment of the composite drive wheel of this invention (FIGS. 2 and 4) is provided with the flange 13 which includes an inner flange portion 17 which is shown formed obliquely with respect to the plane of the plate 12, and an outer flange portion 18 extending from the flange portion 17 in a position substantially perpendicular to the plane of the plate 12 (FIG. 3).

The outer flange portion 18 has first serrations 19 inwardly from the edge of the flange portion 18. Similarly, the outer flange portion 18 has second serrations 20 which respectively intersect serrations 19. The respective portions of the outer flange 18 adjacent the intersecting serrations 19 and 20 and outer edge 21 of the outer flange portion 18 comprise tooth roots 14 when these portions are bent outwardly along the line 22 to a radial position (FIG. 2) to provide the tooth root portions 14.

The plastic toothed rim 15 is molded over the tooth roots 14 and the flange 13. The rim 15 is provided with teeth 23 which are respectively substantially complemental with respect to the tooth roots 14.

The second embodiment of the composite drive wheel of this invention (FIGS. 5-7) is provided with the general elements which I refer to above with respect to the first embodiment of this invention, however, the elements of the second embodiment of this invention are provided in a somewhat different manner and configuration.

The composite sprocket 10 of the second embodiment of this invention (FIGS. 5-7) includes, among other things, a hub 11 or other similar means for securing the sprocket to a shaft, a stamped plate body 32, a flange 33, tooth roots 14 and a plastic rim 35.

The plate 32 of the second embodiment of the composite drive wheel of this invention (FIGS. 5-7) is provided with the flange 33 which includes an inner flange portion 37 which is shown formed obliquely with respect to the plane of the plate 32, and an outer flange portion 38 extending from the flange portion 37 in a position substantially perpendicular to the plane of the plate 32 (FIG. 6).

The outer flange portion 38 has U-shaped serration lines 39 provided within the axial width of the outer flange portion 38 to provide the tooth roots 34. When the portions 34 are bent outwardly along the line 42 to a position oblique to the radius of the plate 32 (FIG. 5), the second embodiment of this invention is provided with extending tooth roots 34.

The plastic toothed rim 35 is molded over the tooth roots 34 on the flange 33 and is provided with teeth 43 which are respectively substantially complemental with respect to the tooth roots 34.

It should be noted that the toothed root rims 15-35 of the first and second embodiments of this invention illustrate two general configurations which may be molded over the tooth roots and flange of the respective plates 12-32. In particular, it should be noted that the toothed rim 15 completely covers the flange 13 of the first embodiment of this invention (FIG. 3) while the toothed rim 43 covers substantially only the outer flange portion 38 of the flange 33 in the second embodiment of this invention (FIG. 6).

It is to be understood that the invention is not to be limited to the specific constructions and arrangements shown and described, as it will be understood to those skilled in the art that changes may be made without departing from the principles of the invention.

What is claimed is:

1. A method of making a composite drive wheel device which comprises the steps of:

forming a flange on a wheel plate body at an angle with respect to the plane of the body;

cutting the flange to provide tooth root forms therein;

radially deforming said tooth root forms outwardly to provide outwardly radially extending tooth roots on said flange; and molding a plastic tooth rim on said tooth roots with the teeth of said rim substantially respectively and complementally positioned over said tooth roots.

2. A method as recited in claim 1 in which said plastic tooth rim is molded on and around said tooth roots and said flange to encase said tooth roots and at least a portion of said flange.

References Cited

UNITED STATES PATENTS

| | | | |
|---|---|---|---|
| 779,165 | 1/1905 | Junghans. | |
| 1,445,358 | 2/1923 | Russell. | |
| 1,638,140 | 8/1927 | Best. | |
| 1,771,370 | 7/1930 | Benge | 74—449 |
| 2,720,119 | 10/1955 | Sherman | 74—460 |
| 3,199,364 | 8/1965 | Dew | 74—460 |

JOHN F. CAMPBELL, Primary Examiner

V. A. D. PALMA, Assistant Examiner

U.S. Cl. X.R.

74—439